Aug. 8, 1944.   H. R. JOHNSON   2,355,077
TREATMENT OF HYDROCARBONS
Filed Oct. 17, 1941
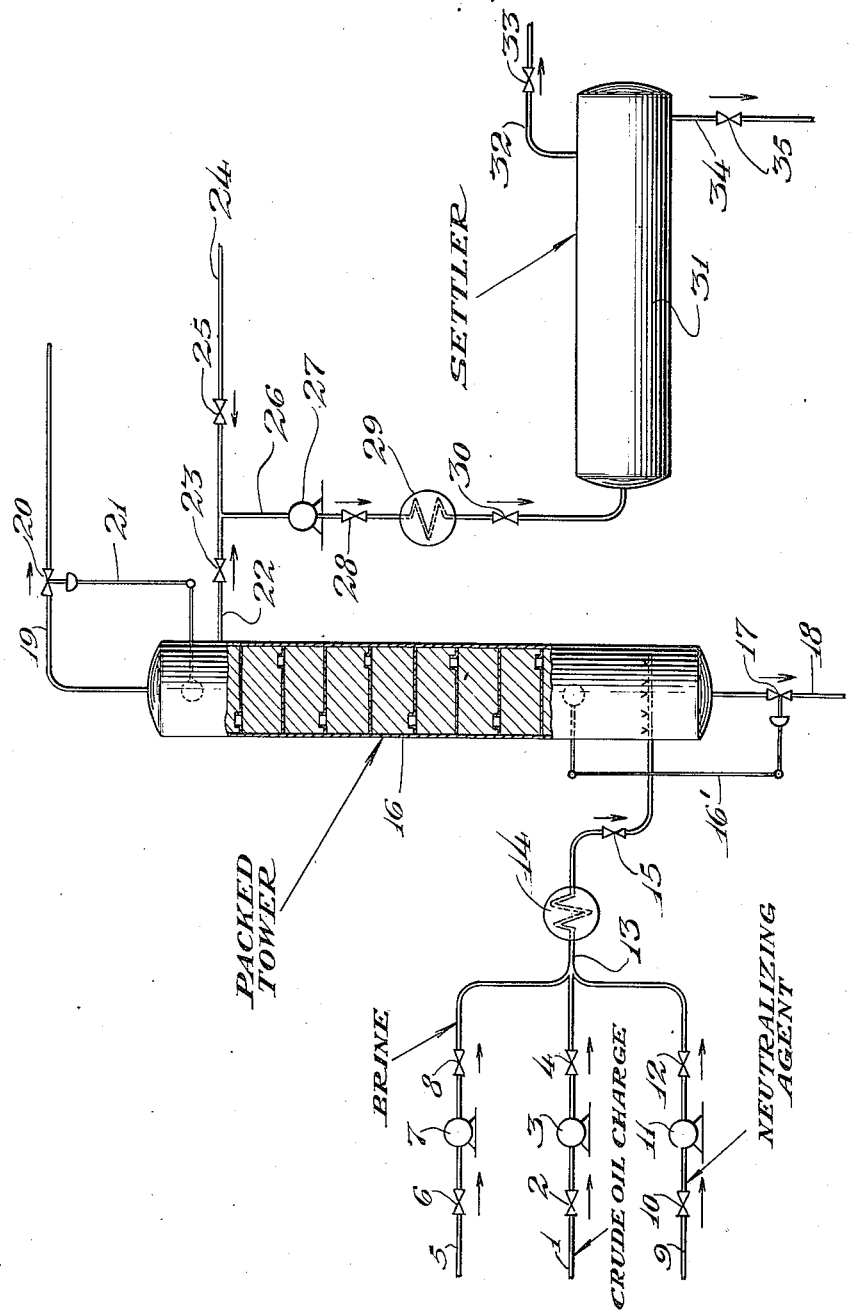

Patented Aug. 8, 1944

2,355,077

UNITED STATES PATENT OFFICE 2,355,077

TREATMENT OF HYDROCARBONS

Harley R. Johnson, Tulsa, Okla.

Application October 17, 1941, Serial No. 415,381

9 Claims. (Cl. 252—324)

This invention relates to a process for treating crude petroleum oils to reduce the content of foreign material, particularly salt, which may be contained therein. More specifically, it relates to an improved method for desalting and removing other suspended solid materials which are detrimental in subsequent operations if left in the crude petroleum oil.

The presence of salt, either in the form of an emulsion or of suspended crystals is objectionable because of the fact that when the oil is cracked the salt accelerates the deposition of foreign material including coke in the tubes and other parts of the plant, resulting in increased costs for clean-outs and shorter periods of operation. By removing salt and other foreign material it is possible to improve the results obtained on the cracking units. One method of desalting crude oil is by washing with hot water; another method is to precipitate the material by electrical methods. Filtration through a filter aid has been suggested.

In one specific embodiment the present invention comprises treating crude petroleum oil with brine and a neutralizing agent, heating the mixture to a temperature of approximately 150 to about 200° F., passing it through a pool of brine maintained substantially at the neutral point, passing the oil in heated condition through a bed of porous filtering material, mixing the filtered oil with water, heating it to a temperature below the boiling point of water at the operating pressure and in the range of about 250 to about 375° F. at a pressure adequate to prevent boiling of the system, and separating the desalted oil.

One embodiment of the invention is illustrated by the accompanying drawing which is diagrammatic and should not be construed as limiting it to the exact conditions given therein.

Crude oil is introduced through line 1, containing valve 2, pump 3, and valve 4. This may be any salt-containing crude oil wherein the salt and other foreign material is present either as an emulsified solution of salts, or as salt crystals and/or sediment suspended in the oil. The latter may be surrounded by a more or less difficultly permeable film of oil or asphaltic material which prevents ready separation from the oil and which also prevents or renders difficult sufficient removal of salt from the oil by conventional treatment with hot water.

The oil is mixed with a solution of salt or salts which may include sodium chloride and other soluble salts hereinafter referred to as brine, introduced through line 5, containing valve 6, pump 7, and valve 8. The oil is mixed with a neutralizing agent entering through line 9, containing valve 10, pump 11, and valve 12. The neutralizing agent may be alkaline or acidic, depending on whether the oil undergoing treatment is acid or alkaline.

The neutralizing agent mixed with the oil and brine may consist of an acid in such instances as the crude oil has an alkaline reaction. These may include organic or inorganic acids such as acetic acid, formic acid, propionic acid and the like, or a mineral acid such as hydrochloric acid, sulfuric acid, etc. Dilute acid recovered from sludges from other treating processes in the refinery may also be employed.

The mixture passes through line 13, which may contain heat exchanger 14 or its equivalent, and valve 15. It is heated to a temperature of about 150-200° F., more or less, and a pressure which may be sufficient to force the oil through the filtering material described hereinafter. The oil enters the packed tower 16 through a spray maintained near the bottom of the tower. A liquid level of brine kept at substantially the neutral point by means of the neutralizing agent is maintained in the bottom of the tower below the filtering material, by any known means such as the liquid level controller 16' which actuates valve 17 contained in line 18. The oil may also be treated with brine in a separate vessel. The entering mixture of oil and brine passes upward through the pool of brine and a separation of the major portion of the brine solution takes place.

The brine solution used may vary considerably in composition but the optimum range of concentration has been found to be about 3–10% by weight of salts of which sodium chloride may form a major constituent. About 2–15% by volume of brine is usually used based on the crude oil charge. It has been found that the use of brine gives superior results over those obtained with pure water. Furthermore, this solution may contain small concentrations of a buffer solution, particularly when operating with a slightly alkaline system, for example, between 7 and 8 pH. Brine solution from the process may be made to the desired concentration and recycled. Demulsifying or wetting agents such as certain alkali metal phosphates, naphthenates, etc., may be used. Although in most cases a pH of about 7 is preferred, the solution may be slightly on the alkaline side in some cases.

The oil passes upward through the tower which contains packing material disposed therein. The design of the tower is not limited to any one particular form but one satisfactory apparatus consisted of a vertical shell containing bubble decks from which the caps were removed, the packing material being disposed on the trays, so that the upwardly rising oil passed through the filtering material by way of a tortuous path. The packing material may comprise fibrous substances such as hay, cereal straws, mineral wool, rock wool, asbestos, and the like or may consist of granular, porous materials such as limestone, caliche, pumice, fire-brick, and other porous materials which are not readily disintegrated by contact with water and/or oil. The exact manner in which the brine treatment followed by the filtering treatment functions is not fully understood. It is known that a small amount of solid suspended material such as shale or mud, including some salt, is removed but the salt content of the oil is rarely reduced more than about 20-25% and the reduction is not of a commercially feasible amount. Microscopic examination of an oil containing suspended salt crystals show that they vary in size in the oil as it is produced. The crystals appear to become of a more uniform size after passage through the brine treatment and the filtering step of the present process. Another important function of the steps appears to be to break up or disintegrate the film of oil or asphaltic material surrounding the suspended salt crystals in such a manner that in the subsequent washing step which is given the oil, the hot water is enabled to contact the salt particles and dissolve them.

In any event, the brine treatment and filtration steps put the oil in a condition such that the final washing and settling steps are more effective in removing salt from the oil. Without these two steps, both of which are necessary, the salt is much more difficult to remove and, in fact, cannot, in many cases, be removed to the desired extent by ordinary washing methods. It is recognized that some oils can be desalted to a sufficient extent by methods now in use. In many of these cases my process will give improved results. In the main, my invention is intended for use with those oils which are not readily desalted by the conventional processes and which therefore present special problems of salt removal.

The upper portion of tower 16 is usually empty of packing material. It may serve as a means for separating any gas which is dissolved in the crude oil and which is liberated at the temperature and pressure used. The gas passes out of the tower through line 19 and valve 20 which may be actuated by liquid level controller 21 or its equivalent. This gas may be sent to a suitable recovery system or may be sent to the crude oil fractionator. The oil itself is withdrawn through line 22, containing valve 23, and is mixed with water entering through line 24 and valve 25. Although a mixer is not illustrated it is within the scope of the invention to use one.

The water is preferably comparatively soft and may comprise treated boiler water. The mixture of oil and water passes through line 26, containing pump 27, valve 28, heat exchanger 29, and valve 30. It is heated to a temperature of the order of about 250° F. to about 375° F., more or less. Lower temperatures give somewhat poorer results and higher temperatures are to be avoided, particularly with crude oils containing substantial amounts of low boiling fractions, because vaporization of the oil may occur. It is understood that there may be considerable variation but a temperature within the range of about 275-350° F. is usually optimum. The pressure maintained should be adequate to prevent substantial boiling of either the oil or the water. The mixture passes into settler 31 and the desalted oil is removed from line 32, containing valve 33. The aqueous layer is drawn through line 34 and valve 35.

The following examples are given to illustrate the usefulness of the process but should not be interpreted as limiting the process to the exact materials or conditions given therein:

Example I

A West Texas crude oil containing approximately 200 pounds of salt per thousand barrels of oil was treated according to my invention. The oil was mixed with about 5% by volume of a 6% brine solution. Sodium hydroxide solution was added to the mixture in sufficient quantity to maintain the brine soluton at about the neutral point and at all times below pH 8, at the end of the operation. The use of the alkali was necessary since the crude oil had an acid reaction. The mixture was heated to about 170° F. and passed through a pool of brine solution and thence through a filtering tower containing granular caliche. The filtered oil was then mixed with boiler water which had been softened to reduce the total hardness. About 5% by volume of water was used. The mixture was heated to 320° F. at a pressure of about 235 pounds per square inch. The oil was separated from the water while under approximately these conditions of temperature and pressure. The salt content of the oil was reduced to about 12 to 15 pounds per thousand barrels of oil.

Example II

The West Texas crude oil was treated under similar conditions to those used in Example I except that the filtering material in the tower was cereal straw. This treatment reduced the salt content to less than 20 pounds per thousand barrels of crude oil. In this case the brine solution used in the first step was prepared from the water separated in the final step by allowing it to evaporate to the preferred concentration; namely, about 6%.

Example III

The West Texas crude oil was treated in a manner similar to that described in Example I, using granular pumice as the filtering agent. The salt content was reduced to less than 20 pounds per thousand barrels of oil.

Example IV

In this run the West Texas crude oil was treated in a manner similar to that described in the foregoing examples except that a rock wool was used as the filtering agent. The salt content was reduced to approximately 15 to 20 pounds per thousand barrels.

Example V

The West Texas crude oil was treated as described in Example I but using granular calcined fire clay as the packing material. The salt content was reduced to less than 25 pounds per thousand barrels by this treatment.

In order to show that the combined steps are essential and that they must be employed in the sequence named, a sample of oil was taken immediately following the filtering treatment; that is, the oil had been treated first with the brine and then passed through the packing material. At this point the salt content was reduced by not more than 20–25% of the original value. When using only the hot water treatment without the previous brine and filtration treatment the salt content of the oil could be reduced to a minimum of about 50–60 pounds per thousand barrels. If the steps were reversed, that is, if the oil were treated with hot water and then with the brine and filtered, the desired reduction was not obtained. The oil contains about 40–60 pounds of salt per thousand barrels after such a treatment.

When operating according to my invention to produce an oil containing less than about 20 pounds of salt per thousand barrels of oil, it was possible to operate the cracking plant with this type of crude oil for a matter of 56 days as compared to about 25 days' operation when treating the oil with hot water. Even after 56 days of operation the plant was in better condition than after 25 days of operation using crude oil prepared by the other method of salt removal. The coke deposits were less dense and the amount of corrosion in the plant was greatly reduced.

I claim as my invention:

1. A process for desalting crude petroleum oil which comprises treating said oil with a brine solution maintained at substantially the neutral point at a temperature above about 150° F., passing the oil through a filtering bed of porous material which will not disintegrate upon contact with the water or oil under the conditions of treatment, treating the filtered oil with water at a temperature above that used in the brine treatment and at a pressure adequate to prevent substantial vaporization, and separating the desalted oil.

2. The process of claim 1 wherein the filtering material comprises essentially caliche of the limestone type.

3. The process of claim 1 wherein the filtering material comprises essentially cereal straw.

4. The process of claim 1 wherein the filtering material comprises essentially a porous mineral which does not disintegrate readily under the treating conditions.

5. A process for desalting crude hydrocarbon oil which comprises treating said oil at a temperature of from about 150° to about 200° F. with brine solution, contacting the oil with a porous filtering material which will not disintegrate under the conditions of treatment at substantially the same temperature, thereafter mixing the oil with water and heating the mixture to a temperature of from about 250° to about 375° F. under a superatmospheric pressure sufficient to maintain the mixture in substantially liquid phase, and separating the crude oil from the water.

6. A process for desalting crude hydrocarbon oil which comprises mixing said oil with brine solution maintained at substantially the neutral point, passing said mixture through brine solution maintained at substantially the neutral point and at a temperature of from about 150° to about 200° F., separating oil from the brine and passing the oil substantially free of brine and at substantially the same temperature through a porous filtering material which will not disintegrate under the conditions of treatment, treating the filtered oil with water at a temperature of from about 250° to about 375° F. under a pressure adequate to maintain the mixture in substantially liquid phase, and thereafter separating the desalted oil.

7. A process for desalting crude hydrocarbon oil which comprises treating said oil at a temperature of from about 150° to about 200° F. with brine solution, contacting the oil with a filtering material comprising caliche of the limestone type at substantially the same temperature, thereafter mixing the oil with water and heating the mixture to a temperature of from about 250° to about 375° F. under a superatmospheric pressure sufficient to maintain the mixture in substantially liquid phase, and separating the crude oil from the water.

8. A process for desalting crude hydrocarbon oil which comprises mixing said oil with brine solution maintained at substantially the neutral point, passing said mixture through brine solution maintained at substantially the neutral point and at a temperature of from about 150° to about 200° F., separating oil from the brine and passing the oil substantially free of brine and at substantially the same temperature through a filtering material comprising caliche of the limestone type, treating the filtered oil with water at a temperature of from about 250° to about 375° F. under a pressure adequate to maintain the mixture in substantially liquid phase, and thereafter separating the desalted oil.

9. A process for desalting hydrocarbon oil which comprises treating said oil with a brine solution at an elevated temperature not in excess of about 200° F., contacting the oil with a filtering bed of porous material which will not disintegrate under the conditions of treatment, thereafter treating the oil with water at a temperature above that used in the brine treatment and at a pressure adequate to maintain the system in substantially liquid phase, and separating the desalted oil.

HARLEY R. JOHNSON.